United States Patent
Abdallah

[19]

[11] Patent Number: 5,950,488
[45] Date of Patent: Sep. 14, 1999

[54] POSITIVE ENGAGEMENT CONTINUOUSLY VARIABLE TRANSMISSION

[76] Inventor: Abdalla Aref Abdallah, P.O. Box 214 Prince Hamza Suburb 11733, Amman, Jordan

[21] Appl. No.: 09/059,322

[22] Filed: Apr. 13, 1998

[51] Int. Cl.$^6$ .............................. F16H 29/04; F16H 29/18
[52] U.S. Cl. .................................................. 74/63; 74/117
[58] Field of Search ........................................ 74/63, 117

[56] References Cited

U.S. PATENT DOCUMENTS

| | | | |
|---|---|---|---|
| Re. 30,364 | 8/1980 | Harris | 74/116 |
| 1,508,220 | 9/1924 | Frey | 74/112 |
| 3,442,156 | 5/1969 | Novinger | 475/344 |
| 3,442,157 | 5/1969 | Novinger | 475/296 |
| 3,507,162 | 4/1970 | Nomura | 475/14 |
| 3,820,416 | 6/1974 | Kraus | 475/185 |
| 4,259,874 | 4/1981 | Guirriec | 474/28 |
| 4,326,431 | 4/1982 | Stephenson | 74/63 |
| 4,424,726 | 1/1984 | Galbraith | 475/185 |
| 4,526,061 | 7/1985 | Sakakibara | 474/28 |
| 4,608,885 | 9/1986 | Kovinunen | 475/210 |
| 4,726,243 | 2/1988 | Rohde | 476/6 |
| 4,726,244 | 2/1988 | Le Pencier | 475/192 |
| 4,850,248 | 7/1989 | Korban | 475/14 |
| 5,036,716 | 8/1991 | Daniehl | 74/63 |
| 5,071,393 | 12/1991 | Genovese | 475/166 |
| 5,071,394 | 12/1991 | Lester | 475/185 |
| 5,098,345 | 3/1992 | Sebastiaan | 474/8 |
| 5,288,280 | 2/1994 | Polnik | 475/185 |
| 5,351,568 | 10/1994 | Feteri | 74/63 |
| 5,484,346 | 1/1996 | Tokumoto | 475/185 |
| 5,545,100 | 8/1996 | Roovers | 475/185 |
| 5,545,101 | 8/1996 | Kawase | 475/193 |
| 5,645,507 | 7/1997 | Hathaway | 476/47 |

Primary Examiner—Allan D. Herrmann

[57] ABSTRACT

A device for transmitting rotational power that relays on mechanical gearing and has a continuous range of output-to-input speed ratio comprises two radially grooved discs (16, 28), sliding teeth(22), an internally saw-toothed gear (26), a ring-shaped spring(24) and a control mechanism(38). The sliding teeth(22) are meshed with the internal gear (26) and held in their position by the spring(24). The sliding teeth(22), the internal gear(26) and the spring(24) are placed between the discs(16, 28) in such a way that side edges of each sliding teeth(22) are inside the radial grooves(18, 30) of the discs(16, 28). The radially grooved discs(16, 28) are connected at their axis of rotation. The control mechanism (38) is used to offset the axis of rotation of the discs(16, 28) from the axis of rotation of the internal gear(26) thus changing their speed ratio. The discs (16, 28) will rotate with the same speed as the internal gear(26) when their axes of rotation coincide with each other. In an offset position, the sliding tooth(22) with the smallest distance from the axis of rotation of the discs(16, 28) will transmit the power from the internal gear(26) to the discs(16, 28) while the rest of the sliding teeth(22) will be slipping over the ramps of the internally saw-toothed gear(26). Therefore the ratio of the rotational speed of the discs(16, 28) to the rotational speed of the internal gear(26) will increase as the distance between their axes is increased.

2 Claims, 5 Drawing Sheets

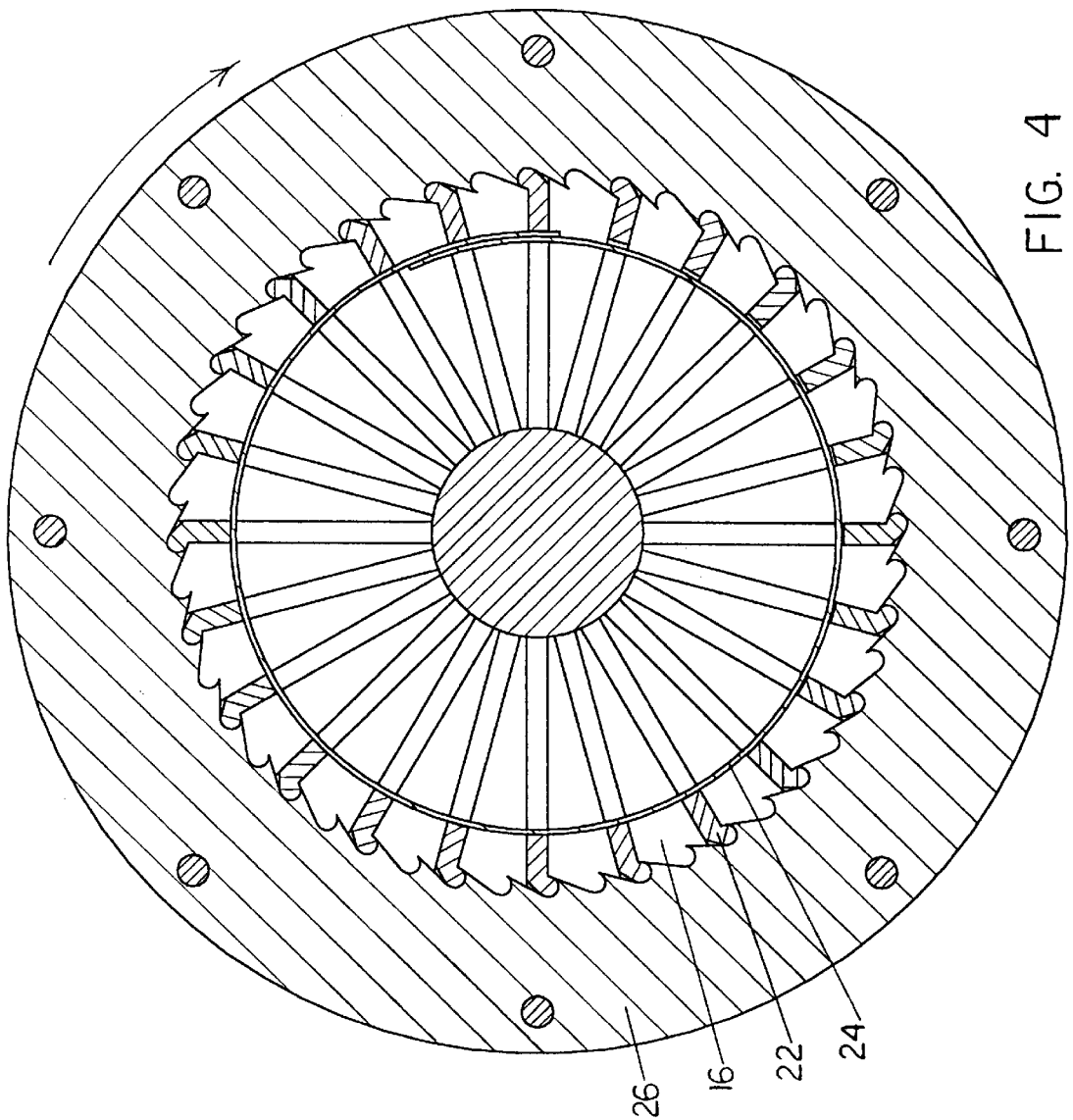
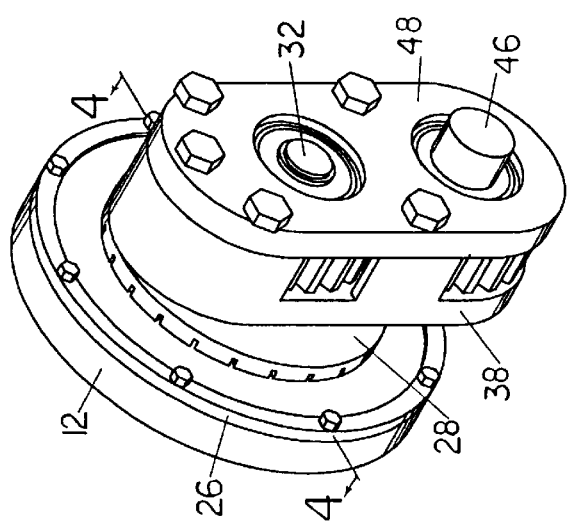
FIG. 4
FIG. 3

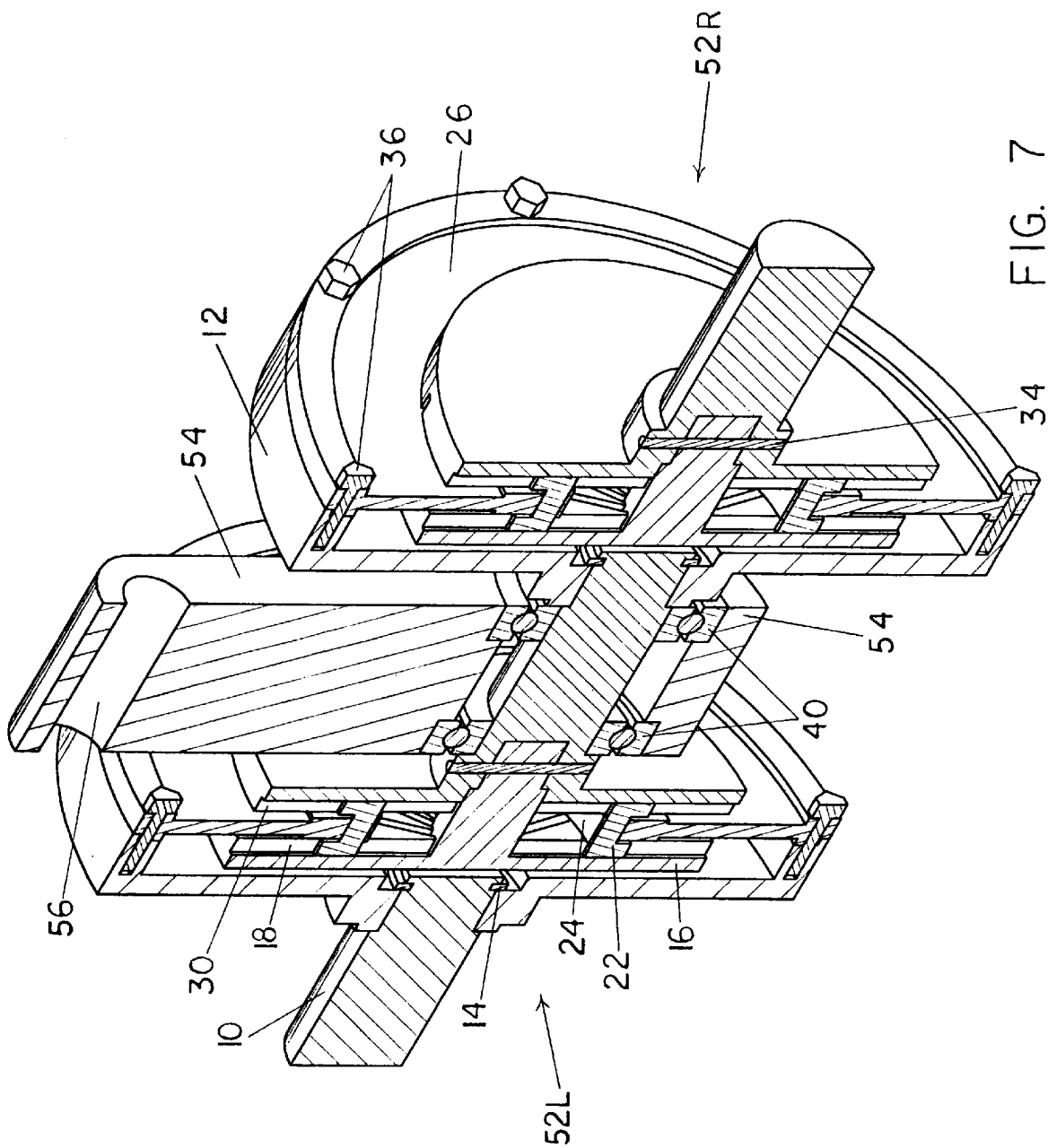

POSITIVE ENGAGEMENT CONTINUOUSLY VARIABLE TRANSMISSION

BACKGROUND

1. Field of Invention

This invention relates to transmitting rotational power efficiently by matching input speed and torque with output requirements. A positive engagement continuously variable transmission (PECVT) has no restriction on the number of gear ratios as in conventional transmissions. Instead it has a continuous range of gear ratios. This invention will mostly be used by the motor vehicle industry.

2. Discussion of the Prior Art

Despite the technological advancement in the motor vehicle industry, the standard transmissions used in motor vehicles are not efficient, that is the available power of the engine can only be delivered to the wheels at certain vehicle's speeds. Major engine and vehicle manufacturers are constantly seeking improved technique for transmitting power efficiently from a vehicle's engine to its wheels. Two main types of continuously or infinitely variable transmissions(CVT or IVT) are being investigated by the industry. These types are the belt and the traction drives. The belt type CVT (basically two variable diameter pulleys connected by a belt) whether push, pull, fabric-reinforced rubber or multi-segmented steel drive belt has low torque-carrying capabilities which limits its application to vehicles with low power requirements. It also needs a starting device such as a torque converter or a multi-plate clutch to smooth the loads encountered when starting the vehicle from rest. Furthermore, very strong and exotic materials are required in manufacturing belt type CVT due to the high loads imposed on its internal mechanism, sliding wear surface and contact fatigue.

On the other hand is the traction drives(IVT) which basically consists of two rotating conical steel rollers that transfer torque between themselves through viscous shear of a thin film of lubricant, or uses a pivotal traction roller inter-spaced between an input and output torroidel discs. The major problem associated with the traction drives is durability which result from high surface fatigue that occur on the traction element. Other problems are associated with the excessive weight, high cost and limiting factors such as fluid issues.

OBJECTS AND ADVANTAGES

Accordingly several objects and advantages of my invention are to provide an efficient and practical way of transmitting power from a vehicle's engine to its wheels by matching engine speed and torque output to meet drive wheel requirements. Consequently, my invention offers a range of significant benefits; better fuel economy, better acceleration and reduction in emissions. Furthermore my invention has several advantages over the belt type CVT and the traction drives IVT. It has better durability, the potential to withstand high power and torque impulses, and lower cost. In addition, the use of my invention is not limited to the motor vehicle industry due to the fact that the design can easily be miniaturized.

DESCRIPTION OF DRAWINGS

FIG. 3 shows a perspective view of the preferred embodiment of the invention where the control mechanism is at a minimum ratio position.

FIG. 4 shows a sectional view taken along the line 4—4 of FIG. 3 (note: FIG. 4 is not drawn to scale so as to show details more clearly).

FIG. 6 is not drawn to scale so as to show details more clearly).

FIG. 7 shows a sectional perspective view according to another embodiment of the invention which is cut into two halves by a vertical plane.

Figure 1:
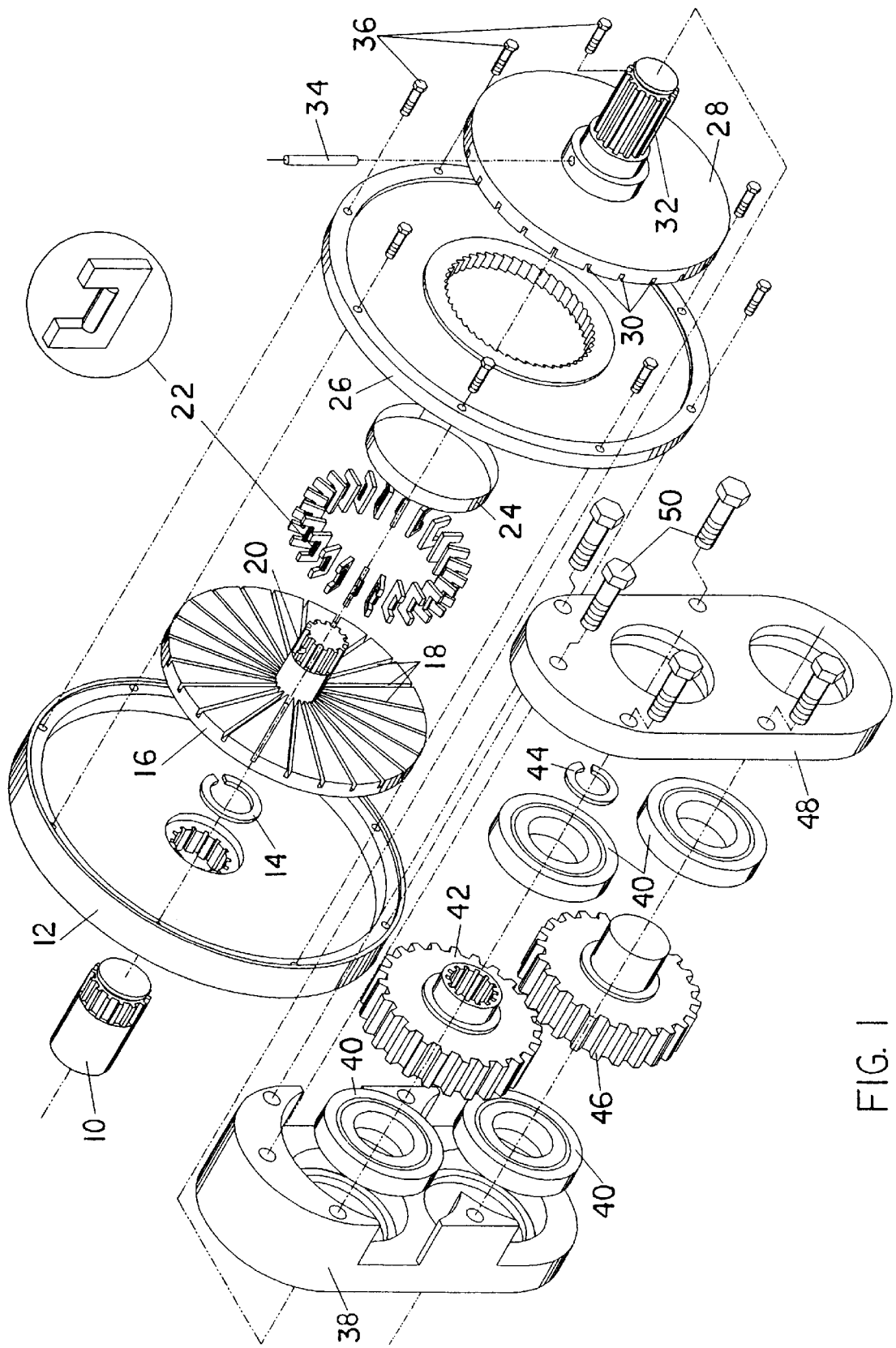
FIG. 1 shows a full exploded view of a PECVT according to the preferred embodiment of the invention.

List Of Reference Numerals 10 input shaft
12 cup-shaped coupling
14 snap ring
16 radially grooved disc
18 radial grooves of 16
20 splined cylindrical extrusion of 16
22 sliding tooth
24 ring-shaped spring
26 internally saw-toothed gear
28 radially grooved disc
30 radial grooves of 28
32 splined cylindrical extrusion of 28
34 pin
36 bolt
38 control mechanism
40 bearing
42 drive gear
44 snap ring
46 output gear
48 control mechanism plate
50 bolt
52L left assembly
52R right assembly
54 control mechanism
56 hole in 54.

DESCRIPTION OF PREFERRED EMBODIMENT OF THE INVENTION

Figure 2:
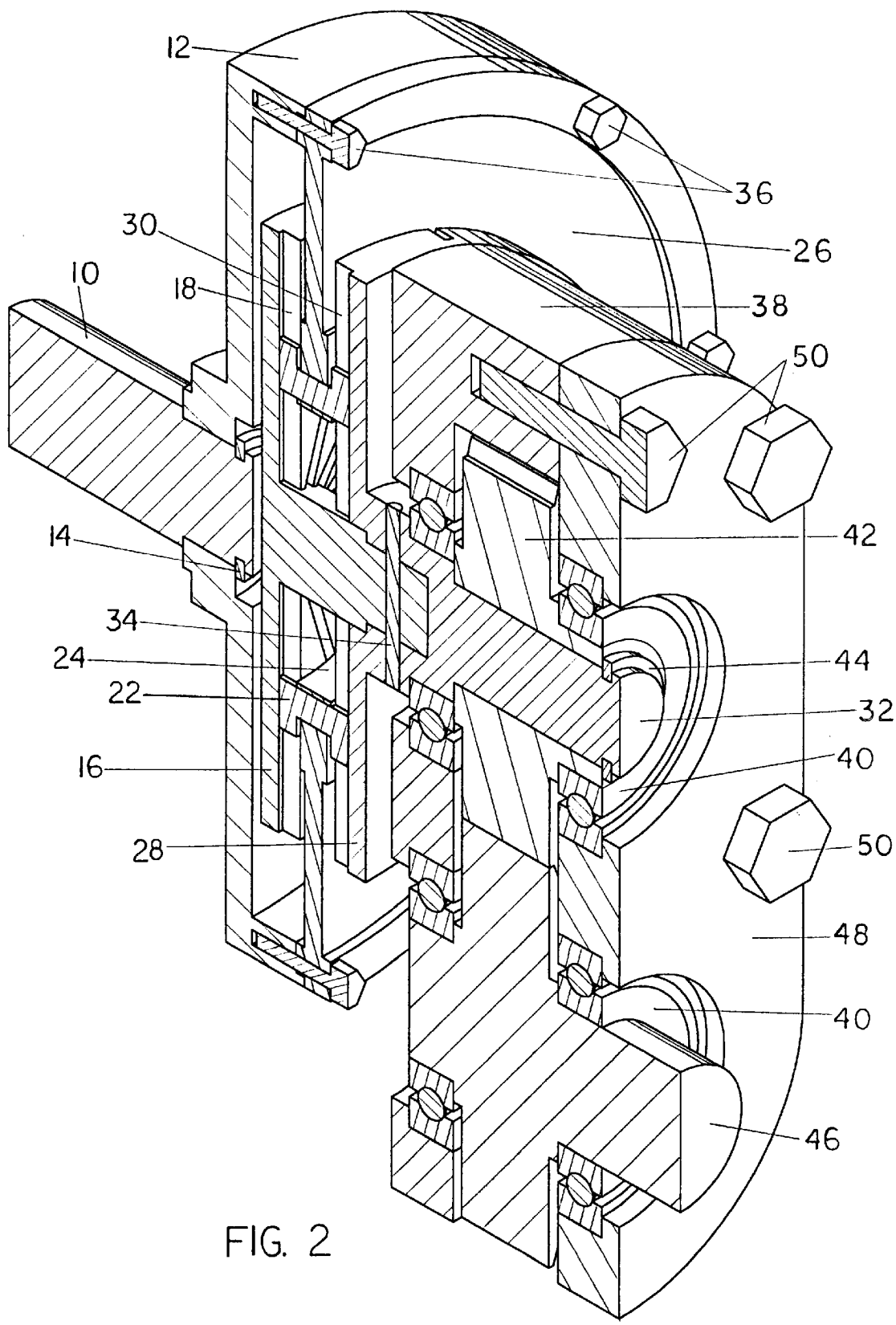
FIG. 2 shows a perspective sectional view of the preferred embodiment of the invention which is cut into two halves by a vertical plane.

FIG. 1 and FIG. 2 show a positive engagement continuously variable transmission according to the preferred embodiment of the invention. The PECVT comprises an input shaft 10 which has a splined end that is mated with a splined hole of a cup-shaped coupling 12, and they are locked together by snap ring 14. Twenty-four sliding teeth 22 are meshed with an internally saw-toothed gear 26 and held in their position by a ring-shaped spring 24( see FIG. 4). The sliding teeth 22, the internally saw-toothed gear 26 and the ring-shaped spring 24 are placed between two radially grooved discs 16 and 28 in such away that side edges of each sliding teeth 22 are inside a radial groove 18 and a radial groove 30. The radially grooved disc 16 couples with the radially grooved disc 28 by means of a splined cylindrical extrusion 20 and a splined hole of the radially grooved disc 28(not shown), and they lock together by pin 34. The cup-shaped coupling 12 is attached to the internally saw-toothed gear 26 by eight bolts 36.

The radially grooved disc 28 is mounted(supported) to the control mechanism 38 by means of upper left bearing 40, drive gear 42, upper right bearing 40, snap ring 44 and the control mechanism plate 48. The radially grooved disc 28 couples with the drive gear 42 by means of splined cylindrical extrusion 32 and splined hole of drive gear 42. The drive gear 42 is meshed with output gear 46 which is supported to the control mechanism 38 by lower left bearing 40, lower right bearing 40 and control mechanism plate 48. The control mechanism plate 48 is attached to the control mechanism 38 by five bolts 50.

The PECVT can be made of various materials depending on its application. In the motor vehicle applications it can be made of steel or other strong alloys. Light weight alloys and composite material can also be used in some parts of the PECVT so as to reduce its weight and the moment of inertia of its rotating parts. In small applications and where small loads are to be encountered, the PECVT can be made of soft material such as plastics and the like.

OPERATION OF PREFERRED EMBODIMENT OF THE INVENTION

The input shaft 10, the cup-shaped coupling 12 and the internally saw-toothed gear 26 rotate as a unit. The radially grooved discs 16 and 28, and the drive gear 42 rotate as a unit and they are mounted (supported) to the control mechanism 38 which can be pivoted about the axis of rotation of the output gear 46 and consequently varying the distance between the axis of rotation of the internally saw-toothed gear 26 and the axis of rotation of the radially grooved discs 16 and 28 (see FIG. 3 and FIG. 5). The drive gear 42 and the output gear 46 have the same diameter and so they will rotate with the same rotational speed but in opposite directions. The sliding teeth 22 are responsible for transmitting rotational power from the internally saw-toothed gear 26 to the radially grooved discs 16 and 28. The function of the ring-shaped spring 24 is to insure engagement of the sliding teeth 22 with the internally saw-toothed gear 26 when the PECVT is at rest (when the PECVT is in operation, the centrifugal acceleration will push the sliding teeth 22 outward).

Usually at the start of the PECVT operation, the control mechanism 38 will be in a vertical position that is where the axis of rotation of the radially grooved discs 16 and 28 coincides with the axis of rotation of the internally sawtoothed gear 26 as in FIG. 3 and FIG. 4. In this position the radially grooved discs 16 and 28 will rotate with the same rotational speed as the internally saw-toothed gear 26. In this position the PECVT is giving one-to-one speed ratio which is the minimum ratio.

Figure 6:
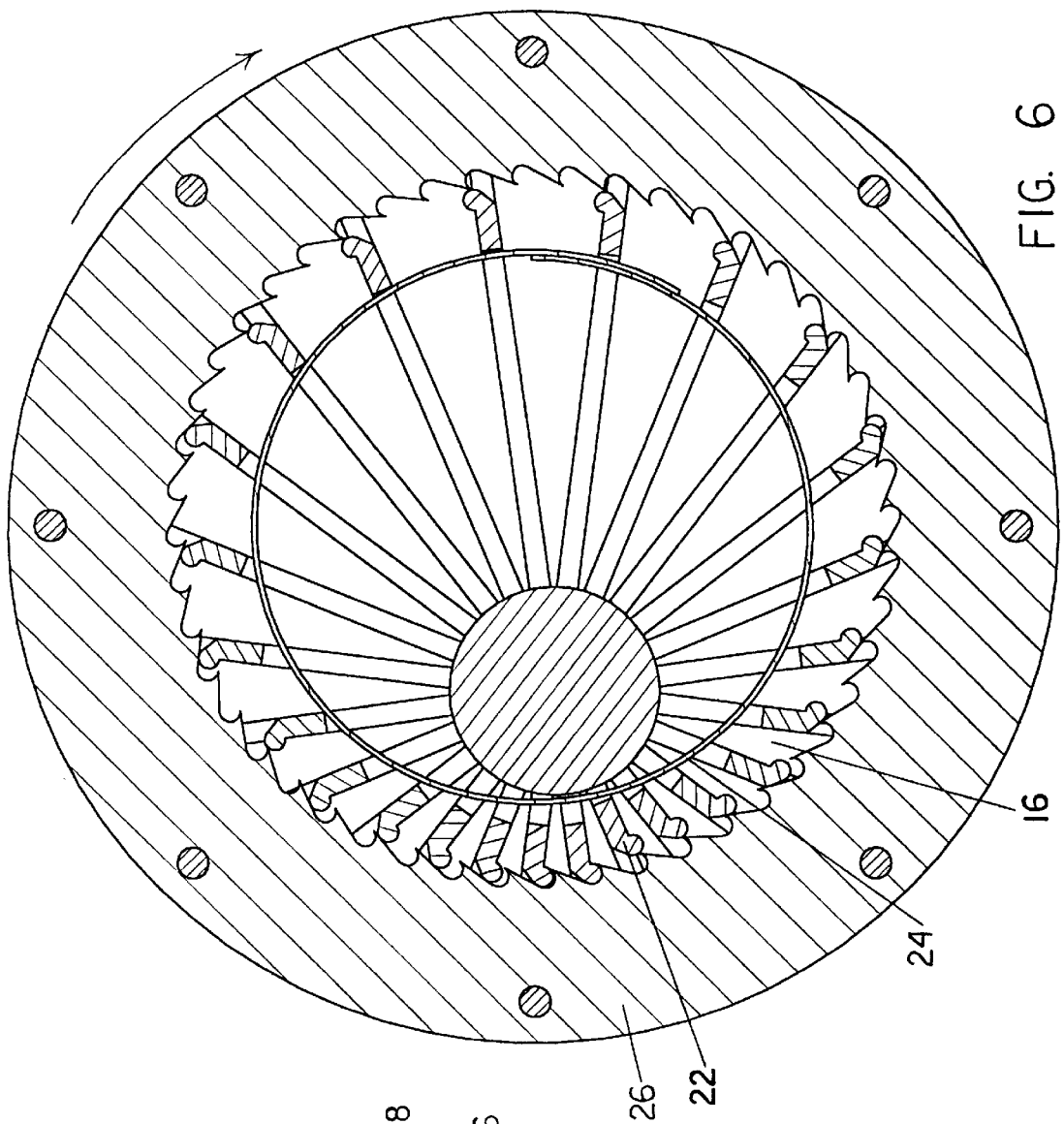
FIG. 6 shows a sectional view taken along the line 6—6 of FIG. 5 (note.
Figure 5:
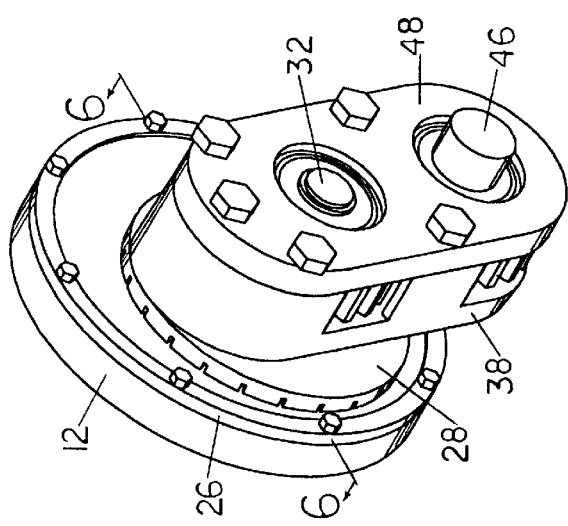
FIG. 5 shows a perspective view of the preferred embodiment of the invention where the control mechanism is at a maximum ratio position.

To increase the output-to-input speed ratio, the control mechanism 38 is pivoted about the axis of rotation of the output gear 46 which results in offsetting the axis of rotation of the radially grooved discs 16 and 28 from the axis of rotation of the internally saw-toothed gear 26 (see FIG. 5 and FIG. 6). In this offset position the speed of the sliding teeth 22 vary according to their distance from the axis of rotation of the radially grooved discs 16 and 28, and therefore the sliding tooth 22 with the smallest distance from the axis of rotation of the radially grooved discs 16 and 28 will be engaged with the internally saw-toothed gear while the rest of the sliding teeth 22 will be slipping over the ramps of the internally saw-toothed gear 26. The output-to-input speed ratio is approximately equal to $R/(R-D)$ where R is the radius of the internally saw-toothed gear 26 and D is the distance between the axis of rotation of the internally saw-toothed gear 26 and the axis of rotation of the radially grooved discs 16 and 28.

It should be mentioned that the PECVT can be used in anther way, that is the output gear 46 becomes an input gear and the input shaft 10 becomes an output shaft and by reversing the direction of the rotational speed. But in this case the sliding tooth 22 with the greatest distance from the axis of rotation of the radially grooved discs 16 and 28 will be engaged while the rest of the sliding teeth 22 will be slipping over the ramps of the internally saw-toothed gear 26. In this case the output-to-input speed ratio is approximately equal to $(R+D)/R$ where R and D are as defined earlier.

Even though the output rotational speed will be fluctuating slightly, the transmission of power is continuous because of the fact that an engaged sliding tooth 22 will not disengage until another sliding tooth 22 takes over. The amplitude of fluctuation of the output rotational speed can be reduced by increasing the number of the sliding teeth 22 and/or the number of teeth of the internally saw-toothed gear 26. In addition an elastic coupling or damper can be used to smooth these fluctuations.

The PECVT will transmit power in one direction, that is it will transmit power from a vehicle's engine to its wheels and not from the wheels to the engine. If power transmission is needed in both directions, two PECVT should be utilized in parallel but in opposite directions (one to transmit power from the engine to the wheels and the other one to transmit power from the wheels to the engine) providing that their input and output speed and their ratios are matched.

DESCRIPTION/OPERATION OF ANOTHER EMBODIMENT

FIG. 7 shows another embodiment of the invention. This embodiment comprises two similar assemblies 52L and 52R, input shaft 10, control mechanism 54 and two bearings 40. Each assembly contains the following parts: cup-shaped coupling 12, snap ring 14, two radially grooved discs 16 and 28, twenty-four sliding teeth 22, ring-shaped spring 24, internally saw-toothed gear 26, pin 34 and eight bolts 36. These parts are the same as the parts of the preferred embodiment of the invention except for the radially grooved discs 28 where the splined cylindrical extrusion 32 is modified. In the left assembly 52L, the radially grooved disc 28 has a cylindrical extrusion with a splined end that mates with the splined hole of the cup-shaped coupling 12 of the right assembly 52R. In the right assembly 52R, the radially grooved disc 28 has a cylindrical extrusion which is the output shaft.

This embodiment—in principle—is like two PECVT connected in series. The radially grooved disc 28 of the left assembly 52L is connected to the cup-shaped coupling 12 of the right assembly 52R, and both are mounted (supported) to the control mechanism 54 by two bearing 40. Pivoting the control mechanism 54 about the center line of hole 56 will result in offsetting the axis of rotation of the internally saw-toothed gear 26 from the axis of rotation of the radially grooved discs 16 and 28 in both assemblies 52L and 52R.

The operation of this embodiment is similar to the operation of the preferred embodiment except that the output-to-input speed ratio is approximately equal to $[R/(R-D)]^2$ where R and D are as previously defined.

CONCLUSION AND SCOPE OF INVENTION

Thus the reader will see that the positive engagement continuously variable transmission provides a reliable, practical and low cost means of transmitting rotational power efficiently by matching input speed and torque to meet output requirements. It doesn't rely on friction to transmit power instead it uses mechanical gearing. Therefore I believe that the reliability of the PECVT will be as good as the reliability of conventional transmissions and since it has several advantages over the conventional transmissions, I also believe that it will be utilized in cars, buss, trucks, etc. Furthermore, its use is not confined to the motor vehicle industry. It can be used in many other applications due to the ease in which the design can be miniaturized and the variety of materials which it can be made of.

While the above description contains many specificities, these should not be construed as limitations on the scope of the invention, but rather as an examplfication of preferred embodiments of the invention. Those skilled in the art will design many other embodiments based on my invention. For example the shape of the parts of my invention can easily be changed. The radial grooves 18 and 30 can be curved instead of being straight, or they can be made with an angle to the radius of the discs 16 and 28. The sliding teeth 22 can also be shaped in many different ways. Those skilled in the art may use individual springs (a spring for each sliding teeth 22) or a system of springs instead of the ring-shaped spring 24. Actually in some designs and applications, the ring-shaped spring 24 is not necessary (for example if the PECVT axis of rotation lies horizontally, about half of the sliding teeth 22 will be pushed against the internally saw-toothed gear 26 because of their weight). Furthermore there are numerous techniques of transmitting power to, or extracting power from the internally saw-toothed gear 26 and the radially grooved discs 16 and 28. In addition a wide range of supporting(mounting) techniques are also possible. The control mechanism 38 or 54 can also be designed in many different ways. Accordingly the reader is requested to determine the scope of the invention by the appended claims and not by the examples which have been given.

I claim:
1. A continuously variable ratio transmission comprising:
   (a) two rotary members each having a surface essentially perpendicular to its axis of rotation and each surface having a plurality of grooves oriented substantially in radial directions,
   (b) a plurality of sliding teeth each having two parallel side edges,
   (c) an internal gear having its teeth shaped similar to the teeth of a hacksaw,
   (d) said plurality of sliding teeth and said internal gear being placed between said two rotary members in such a way that the parallel side edges of each said plurality of sliding teeth are inside two opposite grooves of said two rotary members and said plurality of sliding teeth being able to slide freely in the direction of the grooves of said two rotary members, and
   (e) said two rotary members being connected or attached about their axis of rotation so as to rotate as a unit, and
   (f) The edge pointing away from the axis of rotation of said two rotary members of each said plurality of sliding teeth being shaped in such a way so as to engage with the teeth of said internal gear in one direction and to slip over the ramps of the teeth of said internal gear in the other direction, and
   (g) means of controllably varying the distance between the axis of rotation of said internal gear and the axis of rotation of said two rotary members thereby varying the ratio of the rotational speed of said internal gear to the rotational speed of said two rotary members.
2. The continuously variable ratio transmission of claim 1 further including a spring or a system of springs to push said plurality of sliding teeth against said internal gear.

* * * * *